US010987592B1

(12) United States Patent
Schaeppi et al.

(10) Patent No.: US 10,987,592 B1
(45) Date of Patent: Apr. 27, 2021

(54) SYSTEMS AND METHODS TO CORRELATE USER BEHAVIOR PATTERNS WITHIN AN ONLINE GAME WITH PSYCHOLOGICAL ATTRIBUTES OF USERS

(71) Applicant: 12traits, Inc., Manhattan Beach, CA (US)

(72) Inventors: Joseph Jack Schaeppi, Maple Grove, MN (US); Lynn Bergmann, Berlin (DE)

(73) Assignee: 12traits, Inc., Manhattan Beach, CA (US)

( * ) Notice: Subject to any disclaimer, the term of this patent is extended or adjusted under 35 U.S.C. 154(b) by 0 days.

(21) Appl. No.: 16/894,522

(22) Filed: Jun. 5, 2020

(51) Int. Cl.
*A63F 13/79* (2014.01)
*G09B 7/06* (2006.01)
*A63F 13/67* (2014.01)

(52) U.S. Cl.
CPC .............. *A63F 13/79* (2014.09); *A63F 13/67* (2014.09); *G09B 7/06* (2013.01)

(58) Field of Classification Search
None
See application file for complete search history.

(56) References Cited

U.S. PATENT DOCUMENTS

| 10,881,964 | B1 | 1/2021 | Dills |
| 2008/0081701 | A1 | 4/2008 | Shuster |
| 2009/0054123 | A1 | 2/2009 | Mityagin |
| 2010/0035220 | A1* | 2/2010 | Herz ................ G09B 7/00 434/236 |
| 2010/0227302 | A1 | 9/2010 | McGilvery |
| 2012/0015737 | A1 | 1/2012 | Craine |
| 2012/0022944 | A1* | 1/2012 | Volpi ................ G06Q 30/0255 705/14.53 |
| 2012/0036448 | A1 | 2/2012 | John |
| 2014/0195303 | A1* | 7/2014 | Jarrett ................ G06Q 30/0204 705/7.33 |

(Continued)

OTHER PUBLICATIONS

App User Segmentation: Best Practices & Examples; Kadir Soner; https://appsamurai.com/app-user-segmentation-best-practices-examples/; Sep. 22, 2016; [retrieved from the internet on Apr. 21, 2020].

*Primary Examiner* — Jason T Yen
(74) *Attorney, Agent, or Firm* — Esplin & Associates, PC (57) ABSTRACT

Systems and methods to correlate user behavior patterns within an online game with psychological attributes of users exhibiting the user behavior patterns are disclosed. Exemplary implementations may: store user information associated with the individual users including assignments of the individual users to individual ones of different cohorts of users, wherein the different cohorts are associated with different psychological profiles, where a given psychological profile is defined by multiple psychological parameter values, and the users are assigned to the different cohorts based on the psychological parameter values; obtain performance information that characterizes performances of user behavior patterns by the individual users; and determine correlations between individual ones of the performances of the user behavior patterns and individual ones of the psychological parameters based on the obtained user behavior patterns, the assignments of the users to the cohorts, and commonalities in the psychological profiles of the users within the individual cohorts.

18 Claims, 4 Drawing Sheets

(56) References Cited

U.S. PATENT DOCUMENTS

| | | |
|---|---|---|
| 2015/0254995 A1 | 9/2015 | Rosenfeld |
| 2015/0279227 A1* | 10/2015 | Huber ................... G09B 7/02 |
| | | 434/353 |
| 2015/0365449 A1 | 12/2015 | Kurata |
| 2016/0067612 A1* | 3/2016 | Ntoulas ................ A63F 13/67 |
| | | 463/29 |
| 2017/0186334 A1 | 6/2017 | Sasidhar |
| 2018/0015370 A1* | 1/2018 | Sorek ................... A63F 13/79 |
| 2019/0130511 A1* | 5/2019 | Davier ................. A61B 5/486 |
| 2020/0051450 A1 | 2/2020 | Yeh |
| 2020/0206637 A1 | 7/2020 | Robbins |
| 2020/0401216 A1 | 12/2020 | Sanger |

\* cited by examiner

SYSTEMS AND METHODS TO CORRELATE USER BEHAVIOR PATTERNS WITHIN AN ONLINE GAME WITH PSYCHOLOGICAL ATTRIBUTES OF USERS

FIELD OF THE DISCLOSURE

The present disclosure relates to systems and methods to correlate user behavior patterns within an online game with psychological attributes of users exhibiting the user behavior patterns.

BACKGROUND

Typically, users of a digital environment are not "classified" (e.g., into a user type) until after they have begun interacting with the digital environment and have a large enough sample of use for classifications and/or predictions about future activities to be made based on behaviors within the environment. Users sometimes have difficulty "finding" the activities and/or features on a digital environment that will make them long term, highly engaged users. Even upon classification based on the behaviors, such classifications based on the behaviors may not remain accurate over time. Further, existing techniques fail to understand users psychologically as they interact within a digital environment or experience that may consequently allow the experience to be uniquely adapted to a particular user.

SUMMARY

One aspect of the present disclosure relates to correlating user behavior patterns within an online game with psychological attributes of users exhibiting the user behavior patterns. The users of the online game may be organized into different cohorts based on psychological profiles of the individual users. Such organization may result in users of similar psychological profiles being assigned to the same cohorts. In some cases, determination of the psychological profiles of the individual users may be based on user-provided answers to questions presented to the users that relate to psychological attributes, user behavior patterns, and/or other user-provided information within the online game. The user-provided answers, the user behavior patterns, and/or other user-provided information may be used to determine psychological parameter values of the individual users for the psychological attributes. The psychological parameter values of a given user may be included in the psychological profile of the given user. The user behavior patterns performed within the online game by the individual users over a period of time may be obtained. A given user behavior pattern may be correlated with a given psychological parameter based on the performance of the given user behavior pattern (e.g., frequency, total performances, etc.) by users assigned to a cohort in which users strongly present the given psychological parameter. Such correlations may be used for a variety of purposes within the online game.

One aspect of the present disclosure relates to a system configured to correlate user behavior patterns within an online game with psychological attributes of users exhibiting the user behavior patterns. The system may include one or more hardware processors configured by machine-readable instructions and electronic storage. The machine-readable instructions may include one or more instruction components. The instruction components may include one or more of information component, correlation component, and/or other instruction components.

The electronic storage may be configured to store information associated with the individual users and/or other information. The information associated with the individual users may include user information. The user information may include assignments of the individual users to individual ones of different cohorts of users. The different cohorts may be associated with different psychological profiles. A given psychological profile may be defined by multiple psychological parameter values. The users may be assigned to the different cohorts based on the psychological parameter values of the individual users determined based on stated information provided by the users. By way of non-limiting example, the user information may include user information for a first user that includes an assignment of the first user to a first cohort based on a first psychological profile of the first user determined based on stated information previously provided by the first user. The psychological profiles of the users assigned to the first cohort may indicate strong presentation of a first psychological parameter.

The information component may be configured to obtain performance information that characterizes performances of user behavior patterns by the individual users within the online game. By way of non-limiting example, the individual performances of user behavior patterns may include a first performance of a first pattern by the first user and other users assigned to the first cohort.

The correlation component may be configured to determine correlations between individual ones of the performances of the user behavior patterns and individual ones of the psychological parameters. Determining the correlations may be based on the obtained user behavior patterns, the assignments of the users to the cohorts, and commonalities in the psychological profiles of the users within the individual cohorts. As a result, by way of non-limiting example, a first correlation may be determined between the first performance of the first pattern and the first psychological parameter. The first correlation may be based on relatively frequent performance of the first performance by the users assigned to the first cohort and the psychological profiles of the users assigned to the first cohort indicating strong presentation of the first psychological parameter.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
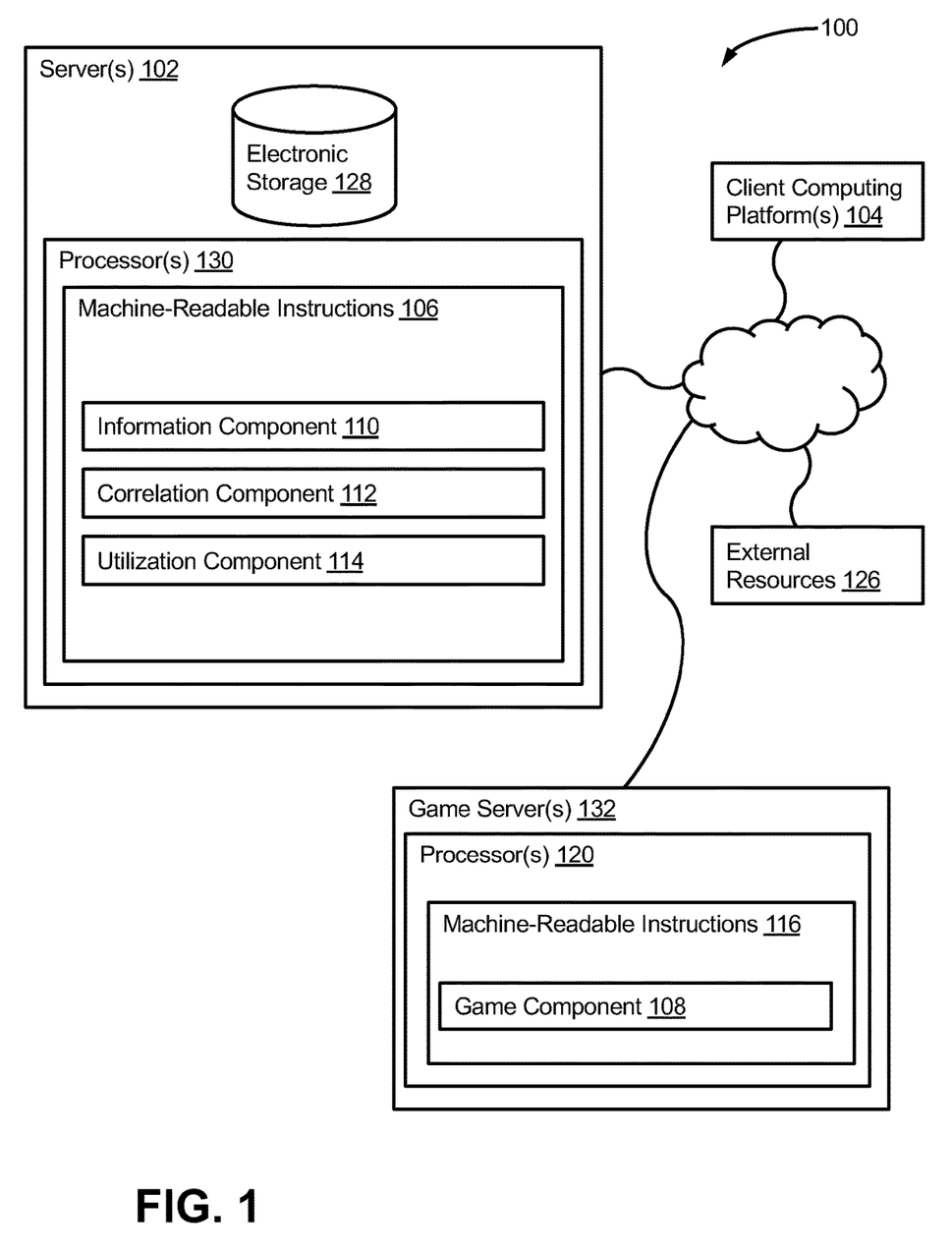
FIG. 1 illustrates a system configured to correlate user behavior patterns within an online game with psychological attributes of users exhibiting the user behavior patterns, in accordance with one or more implementations.

FIG. 1 illustrates a system 100 configured to correlate user behavior patterns within an online game with psychological attributes of users exhibiting the user behavior patterns, in accordance with one or more implementations. In some implementations, system 100 may include one or more servers 102, storage 128, and/or other components. Server(s) 102 may be configured to communicate with one or more client computing platforms 104 and/or game server(s) 132 according to a client/server architecture and/or other architectures. Client computing platform(s) 104 may be configured to communicate with other client computing platforms via game server(s) 132 and/or according to a peer-to-peer architecture and/or other architectures. Users may access game server(s) 132 via client computing platform(s) 104. As used herein, game server(s) 132 may refer to an individual (video) game providers, a gaming console, game companies, website developers, user experience companies, and/or a combination thereof. In some implementations, game server(s) 132 may be configured to provide and/or host one or more (online) games. As used herein, "online game" or variations thereof may include a digital experience. A digital experience may include one or more of a game (e.g., online via web browser, via desktop application, via mobile application, via game console, etc.), a website (e.g., retailers), a mobile application, a desktop application, a social network platform, a service provider (e.g., E-mail provider), and/or other digital experiences. Such digital experiences may collect similar information related to its users and provide some of the same interactions or similar interactions between individual users, between the individual users and virtual content, and/or other interactions. Virtual content (or pieces thereof) may include one or more of a player-controlled character, a non-player-controlled character, a task, a quest, an assignment, a mission, a level, a chapter, a mini-game, a virtual item, a virtual resource (e.g., weapon, tool), an in-game power, an in-game skill, an in-game technology, a user interface component, an image, a video, and/or other pieces of virtual content. By way of non-limiting example, virtual items may include one or more of clothing, pets, transportation units (e.g., aircrafts, motor vehicles, watercrafts, etc.), units, buildings, and/or other virtual items.

Game server(s) 132 may configured by machine-readable instructions 116. Machine-readable instructions 116 may include one or more instruction components. The instruction components may include computer program components. The instruction components may include one or more of game component 108 and/or other instruction components.

Game component 108 may be configured to execute an instance of the online game and implement the instance of the online game by receiving and executing commands. The commands may be received from the users through client computing platforms 104 associated with the users. The users may include a first user, a second user, and one or more other users. Execution of the commands may facilitate interactions between the users and/or content within the online game. Implementing the instance of the online game may include determining individual view information for presentation of the online game to the users on the client computing platforms. Game component 108 may be configured to present the individual view information of the online game to the users.

An online game, may be provided via a virtual space, and may include a plurality of resource types and/or maps. An instance of the virtual space may be executed by computer components to determine views of the virtual space. The views may then be communicated (e.g., via streaming, via object/position data, and/or other information) from server(s) 102, game server(s) 132, and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which views of the virtual space are provided is not intended to be limiting. The virtual space may be expressed in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

User behavior patterns may include actions performed by the users within the virtual space. The actions may include one or more of a purchase, a sale, a trade, a selection of a user interface element, time spent on a particular user interface, time of a session of the online game, engagement with virtual content, communication of the users with particular users, completion of tasks by the users, uncompletion tasks by the users, failure of tasks by the users, frequent interaction with content of the users, formation of alliances by the users, and/or other actions performed by the users. The user behavior patterns may include individual ones of the actions, sets of actions, ordered sets of actions, and/or multiple of the individual actions, the sets of actions, and the ordered set of actions. The performance information may include counts of the user behavior patterns, time information of the user behavior patterns, occurrence of the user behavior patterns, duration of the user behavior patterns, a time period over which the user behavior patterns occurred (e.g., over one week, over one month, over 100 hours, etc.), and/or other performance information. The time information may include, by way of non-limiting example, time of day of the user behavior patterns, day of the week of the user behavior patterns, date of the user behavior patterns, successiveness of the user behavior patterns, whether it the user behavior patterns are a reaction, and/or other time information.

Within the instance(s) of the virtual space, for example, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform (in-game) actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102, game server(s) 132, and/or other sources.

Server(s) 102 may be configured by machine-readable instructions 106. Machine-readable instructions 106 may include one or more instruction components. The instruction components may include computer program components. The instruction components may include one or more of game component 108, information component 110, correlation component 112, utilization component 114, and/or other instruction components.

In some implementations, server(s) 102 may include one or more components the same as or similar to game component 108 that may be configured to execute an instance of the online game and/or otherwise perform some or all of the functionality of game component 108.

Electronic storage 128 may be configured to store information associated with the individual users and/or other information. The information associated with the individual users may include user information. The user information may include stated information previously provided by the individual users, psychological profiles for the individual users, assignments of the individual users to individual ones of different cohorts of users, and/or other information related to the individual users.

The stated information previously provided by the users may be obtained by a component the same as or similar to information component 110. The stated information may include sets of answers to questions that relate to psychological attributes. The individual sets of answers may be provided by individual ones of the users. In some implementations, game component 108 may be configured to effectuate, via graphical user interfaces of the client computing platforms 104, presentation of the questions. In some implementations, the stated information may include the performances of the user behavior patterns. The performances of the user behavior patterns may be executed by the individual ones of the users within one or more various online games. In some implementations, the stated information may include communication information provided by the individual ones of the users within the one or more various online games. The communication information may include textual and/or verbal speech entered and/or spoken, respectively, by the individual users. The sets of answers, the performances of the user behavior patterns, the communication information, and/or other stated information may be transmitted via a network to the one or more processors (e.g., information component 110) to determine sets of psychological parameter values for the individual users. The sets of answers, the performances of the user behavior patterns, the communication information, and/or other stated information may be indicative, facilitate prediction, and/or facilitate determination of one or more psychological parameter values for the individual users.

The different cohorts may be associated with different psychological profiles (of the individual users). A given psychological profile may be defined by multiple psychological parameter values. The psychological parameter values of the individual users may be determined based on the stated information provided by the users. In some implementations, the individual users may be associated with a plurality of psychological profiles within other online games. The plurality of the psychological profiles may be aggregated so that an aggregated psychological profile is generated and/or each of the plurality of the psychological profiles may be updated to include psychological parameters values from other ones of the plurality of the psychological profiles. Thus, the psychological profiles for the individual users may be based on correlating the performances of the user behavior patterns by the individual users from various different online games (e.g., with a first online game, within a retail application, within a charitable website) with one or more particular psychological parameter values.

The users may be assigned to the different cohorts based on the psychological parameter values of the individual users as described in co-pending U.S. application Ser. No. 16/854,660 entitled "SYSTEMS AND METHODS FOR ADAPTING USER EXPERIENCE IN A DIGITAL EXPERIENCE BASED ON PSYCHOLOGICAL ATTRIBUTES OF INDIVIDUAL USERS", the disclosure of which is incorporated by reference in its entirety herein.

The psychological parameter values may characterize, by way of non-limiting example, achievement motivation, motivation, personality inventory, cultural values, competitiveness, positive and negative affect before, during, and/or after engagement with the online game (i.e., emotions), communication style, personal values, daily routines/activities, life/gaming pain points, life/gaming hopes and aspirations, wellbeing, user experience, gaming/experience using time, subscription behavior, affinity information, personality, emotional style, goal orientation, goal commitment, ego and task orientation, relatedness, sense of community, social influence, social identity, group identification, we-identity, quality of life, satisfaction with life, work-related quality of life, mindfulness, happiness, emotional intelligence, self-awareness/internal awareness, external awareness, connectedness to nature, social connectedness, social bonding, perceived stress, depression, anxiety, decision-making style, thinking style, critical thinking, cognitive approach to learning, learning style, attributional style, internality-externality, stability-instability, global-specific, creativity, curiosity, playfulness, exploration, mental strength, grit, flourishing, gratitude, inspiration, spirituality, hedonism, materialism/material values, perceptions, sentiments, and/or other psychological parameters.

Achievement motivation may include compensatory effort, competitiveness, confidence in success, dominance, eagerness to learn, engagement, fearlessness, flexibility, flow, goal setting, independence, internality, persistence, preference in difficult tasks, pride in productivity, self-control, status orientation, ambition, self-assurance, and/or other psychological parameters. Motivation may include mastery, purpose, autonomy, and/or other psychological parameters.

Personality inventory may include neuroticism, openness, conscientiousness, extraversion, and agreeableness and/or other psychological parameters. Neuroticism may include anxiety, impulsiveness, vulnerability, and/or other psychological parameters. Openness may include fantasy, feelings/empathy, action, and/or other psychological parameters. Conscientiousness may include achievement striving, competence, self-discipline, and/or other psychological parameters. Extraversion may include warmth assertiveness, activity, and/or other psychological parameters. Agreeableness may include trust, altruism, modesty, and/or other psychological parameters.

Cultural values may include individualism, indulgence, long term orientation, masculinity, power distance, uncertainty avoidance, and/or other psychological parameters. Competitiveness may include avoidant, collaborative, competitive affectivity, dependent, dominant, general competitiveness, independent, personal enhancement, and/or other psychological parameters.

Positive and negative affect before, during, and/or after engaging in the online game may include hostility, joviality, negative emotions, positive emotions, sadness, self-assurance, and/or other psychological parameters. Communication style may include feeler, intuitor, sensor, thinker, and/or other psychological parameters.

Wellbeing may include social wellbeing, psychological wellbeing, physical wellbeing, physical activity, sleep, bounded reciprocity, resilience grit, and/or other psychological parameters.

Personality may include anger, hostility, depression, self-consciousness, excitement-seeking, positive emotions, gregariousness, ideas, values, aesthetics, tender-mindedness, straightforwardness, compliance, deliberation, order, dutifulness, and/or other psychological parameters.

Emotional style may include resilience, outlook, social intuition, self-awareness, sensitivity to context, attention, and/or other psychological parameters.

Goal orientation may include mastery approach/learning goal orientation, performance approach/performance goal orientation, performance avoid/avoidance goal orientation, and/or other psychological parameters.

Work-related quality of life may include structure, boundaries, focus, efficiency, information provision, communication, psychological support, stress at/from work, psychological safety, connectedness with team, motivation to work, adaptability, job/career satisfaction, control at work, homework interface, general wellbeing, working conditions, and/or other psychological parameters.

Mindfulness may include observing, describing, acting with awareness, non-judgment, non-reactivity, and/or other psychological parameters.

Emotional intelligence may include emotion perception, emotion expression, emotion management, emotion regulation, impulse control, relationships, stress management, and/or other psychological parameters.

Social connectedness may include social connectedness, loneliness, membership self-esteem, private self-esteem, public self-esteem identity self-esteem, interdependent self, independent self, social avoidance, social distress, and/or other psychological parameters.

Decision-making style may include respected, confident, spontaneous, dependent, vigilant, avoidant, brooding, intuitive, anxious, and/or other psychological parameters.

Thinking style may include intuitive, experiential, analytical, rational, and/or other psychological parameters.

Cognitive approaches to learning may include avoidant, participative, competitive, collaborative, dependent, independent, and/or other psychological parameters.

Learning style may include visual (spatial), aural (auditory-musical), verbal (linguistic), physical (kinesthetic), logical (mathematical), social (interpersonal), solitary (intrapersonal), and/or other psychological parameters.

Mental strength may include tenacity, confidence, optimism, adaptability, self-awareness, reliability, responsibility, well-being, and/or other psychological parameters.

Flourishing may include positive emotion, engagement, relationships, meaning, accomplishment, health, loneliness, and/or other psychological parameters.

By way of non-limiting example, the psychological parameter values of the psychological parameters may be a number score on a predetermined range unique to each psychological parameter, a letter score, and/or other type of value than may characterize a particular user as whole.

By way of non-limiting illustration, the user information may include user information for a first user. The user information for the first user may include stated information previously provided by the first user, a first psychological profile of the first user determined based on the stated information, an assignment of the first user to a first cohort based on the first psychological profile, and/or other information related to the first user. The psychological profiles of the users assigned to the first cohort may indicate strong presentation of a first psychological parameter.

Information component 110 may be configured to obtain performance information. The performance information may characterize performances of the user behavior patterns by the individual users within the online game.

By way of non-limiting example, the individual performances of user behavior patterns may include a first performance of a first pattern by the first user and other users assigned to the first cohort.

In some implementations, information component 110 may be configured to store, to electronic storage 128, the information (e.g., user information, the performance information) associated with the individual users.

Correlation component 112 may be configured to determine correlations between individual ones of the performances of the user behavior patterns and individual ones of the psychological parameters. Determining the correlations may be based on the obtained performance information (e.g., the user behavior patterns, relatively frequent performance of the user behavior patterns), the assignments of the users to the cohorts, commonalities in the psychological profiles of the users within the individual cohorts, the user information, and/or other information. Commonalities in the psychological profiles of the users may include common psychological parameters with similar and/or closely similar psychological parameters values. In some implementations, the commonalities in the psychological profiles of the users may include commonalities between individual aggregated psychological profiles of individual users and/or commonalities between individual psychological profiles with a particular online game of the individual users. In some implementations, the individual psychological profiles with the particular online game may include psychological parameters values determined from other psychological profiles within other online games. The correlations may be determined by Pearson correlation coefficient formula, linear correlation coefficient formula, sample correlation coefficient formula, population correlation coefficient formula, machine learning, and/or other formulas to determine the correlations.

It will be appreciated that the description herein of "correlations" between psychological parameters and user behavior patterns which are positively correlated is not intended to be limiting, and that negative correlations between psychological parameters and user-behavior patterns are also contemplated, and may be included in the generic "correlations". The determination of negative correlations may be made in cases where users assigned to a cohort or cohorts strongly presenting a psychological parameter avoid a specific user behavior pattern, and/or where users assigned to a cohort or cohorts that do not present the psychological parameter perform the specific user behavior pattern relatively more (e.g., in frequency, total performances, etc.) than users assigned to the cohort or cohorts that strongly present the psychological parameter.

As a result, by way of non-limiting illustration, a first correlation may be determined between the first performance of the first pattern and the first psychological parameter. The first correlation may be based on relatively frequent performance of the first performance by the users assigned to the first cohort and the psychological profiles of the users assigned to the first cohort indicating strong presentation of the first psychological parameter. The relatively frequent performance of the first performance by the users assigned to the first cohort may be performed more frequently than other user behavior patterns. In some implementations, the other user behavior patterns may include a second pattern performed by the users assigned to the first cohort (i.e., the same cohort as the first performance). In some implementations, the second pattern may be performed by the users assigned to other ones of the different cohorts. As such, the first pattern (or first performance thereof) is performed more frequently than the second pattern.

In some implementations, the information associated with the individual users (i.e., the user information), the correlations, and/or other information may be communicated with game server(s) 132. Game server(s) 132 may download, export, purchase, subscribe to, obtain in real-time, and/or other obtainments the information associated with the individual users, the correlations, and/or other information.

In some implementations, utilization component 114 may be configured to adapt the online game for the individual users based on the determined correlations. By way of non-limiting illustration, a first adaptation to the online game may be made for the first cohort of users, including the first user. Thus, the presented view information (e.g., by game component 108) may include the adapted online game for the individual users. The adaptations to the online game may be modifications to user experiences for the users of the individual cohorts. Modifications to the user experiences may result in a plurality of variations of an online game. For example, based on the cohort that the first user is included in, a user experience of the online game may be oriented towards a storytelling experience versus a competition experience. For example, based on the determined psychological parameter values of a particular user, the user experience (e.g., storyline path, encountered opponents, virtual content, etc.) may be modified to be unique to the particular user. The adaptations to the online game may be modifications to the appearance and/or aesthetic of the online game. For example, based on the cohort that the second user is included in, the theme (e.g., brightness, colors, size, etc.) and/or time of day (e.g., lighting of background) of the online game may be modified. The adaptations may be are designed to enhance prospective usage of the online game by the users.

By way of non-limiting example, the adaptations may include one or more of a recommendation, a suggestion, an adjusted difficulty setting, a piece of game content made available, an omission of game content, means of communication, a communication, an offer to sell one or more virtual items made available, an adjustment of an offer to sell one or more virtual items, an offer to sell bundles or packages of virtual items, development of skills/abilities at a slower or faster rates, means of obtainment of game content, user matching, toxic user detection, and/or other adaptations.

Adapting the recommendations may include adjusting a particular selection and/or action, determined based on their cohort, that the user is advised to select and/or do. Adapting the suggestions may include adjusting particular ideas, plans, and/or strategies for the user to consider executing, following, and/or is determined they will enjoy. The adjusted difficulty setting may adjust how challenging one or more aspects of the online game are. The suggestions and/or recommendations may be adapted such that non-player characters may provide different guidance based on the cluster and/or the cohort and/or Pop-ups directing the user to content can be adapted based on based on the cluster and/or the cohort.

By way of non-limiting example, adjusting difficulty settings may include adjusting how challenging the online game as a whole is, how challenging particular tasks are (e.g., building, battling, problem solving, etc.), how challenging it is to complete one or more levels, adjusting how challenging it is to complete a level with every advancement of a level, and/or other difficulty setting adjustments.

The virtual content may include the game content. The game content made available or omitted by adaptations may include game content that is provided to a user when performing actions within the online game such as exploring a map, researching a technology or skill, purchasing an item within the online game, completing an achievement within the online game, and/or other information. Such game content (or pieces thereof) may include one or more of a player-controlled character, a non-player-controlled character, a task, a quest, an assignment, a mission, a level, a chapter, a mini-game, a virtual item, a virtual resource (e.g., weapon, tool), of in-game powers, in-game skills, in-game technologies, and/or other pieces of game content. By way of non-limiting example, virtual items may include one or more of clothing, pets, transportation units (e.g., aircrafts, motor vehicles, watercrafts, etc.), units, buildings, and/or other virtual items.

Adapting the means of communication may include adjusting the means of communication made available to be used contemporaneously, made available to be used one at a time, omitted, and/or other adjustments on means of communication. The means of communication may include one or more of a textual chat, instant messages, private messages, voice communications, video communications, in-game communication, out-of-game communication, hybrid communication (i.e., in-game and out-of-game), and/or other means of communication. Adapting the communication may include adjusting when communications (e.g., messages, calls) are sent, when communications are received, to whom communications are sent, from whom communications are received, and/or other adjustments on communications.

Adjusting the offer to sell one or more virtual items made available may adjust the price (e.g., money, coins, tokens, stars, etc.) the users must pay for the one or more virtual items or other game content. Adjusting the offer to sell one or more virtual items may adjust which virtual items or game content may be offered to the users to purchase. The offer to sell bundles or packages of virtual items may include adjusting the bundles available for purchase in an online store for the game, and/or a bundle being provided to the user at the beginning of an online game. These adjustments may also include the items included together, the prices of items and other related characteristics.

The means of obtainment of the game content may include by discovery (e.g., exploring a map, in-game research of techs or skills only available to certain users, and/or other discovery), unlocking (e.g., through purchase), achievement (e.g., reward for a quest, an item drop for a boss kill, other PvE activities), and/or other means of obtainment.

Adapting user matching may include more accurately matching users for social circumstances, for competition circumstances, and/or other circumstances. Adapting user matching for competition circumstances may be further adapted for various competition styles. Competition styles may include individual racing, group efforts, group racing, friendly competitions, high intensity competitions, and/or other competition styles.

Adapting toxic user detection may include adapting which individual users or types of users based on their corresponding group and/or cohort may be detected and indicated as toxic (e.g., offensive, harmful, dangerous) to a particular user and/or the online game as a whole.

Adapting the online game may include one or more modifications to the appearance, aesthetic, and/or other user interface presentations of the online game. By way of non-limiting example, user interface presentations may include one or more of colors, layout, landscape, animations, fonts, font sizes, shapes, user interface elements, and/or other user interface presentations. User interface elements may be configured to facilitate user interaction with a user interface, user entry, and/or selection. By way of non-limiting illustration, the user interface elements may include one or more of text input fields, drop down menus, check boxes, display windows, virtual buttons, and/or other user interface elements.

In some implementations, adaptations to the online game may be made for individual users without the individual users being grouped into a cluster and/or cohort. Thus, such adaptations may be unique to the particular user.

In some implementations, utilization component 114 may be configured to assign individual unstated users to individual cohorts. The assignment may be based on performance of user behavior patterns of the individual unstated users, the determined correlations, and/or other information. The users exhibiting user behavior patterns within the online game may include the unstated users. The unstated users may have not provided stated information that determines psychological parameter values associated with the users. Thus, the unstated users may not have psychological profiles defined by the psychological parameter values. By way of non-limiting illustration, the unstated users may include a second user. The second user may be assigned to the first cohort based on a second performance of a second pattern by the second user and the first correlation.

In some implementations, upon assignment of the individual unstated users to the individual cohorts, information component 110 may be configured to obtain the performance information that characterizes performances of user behavior patterns by the individual unstated users. In some implementations, utilization component 114 may be configured to effectuate information component 110 to perform such obtainment upon the assignment of the individual unstated users to the individual cohorts. The determining of the correlations (by correlation component 112) may be based on the obtained performances of user behavior patterns by the individual unstated users. In some implementations, the determining of correlations may be based on the obtained performances of user behavior patterns by the individual unstated users and/or the obtained performances of the user behavior patterns by individual users whom have provided the stated information. including the second performance By way of non-limiting illustration, upon assignment of the second user to the first cohort, the second performance may be obtained. The determination of the correlations may be based on the second performance, the first performance, and/or other performances of user behavior patterns by individual users within the online game.

Figure 3:
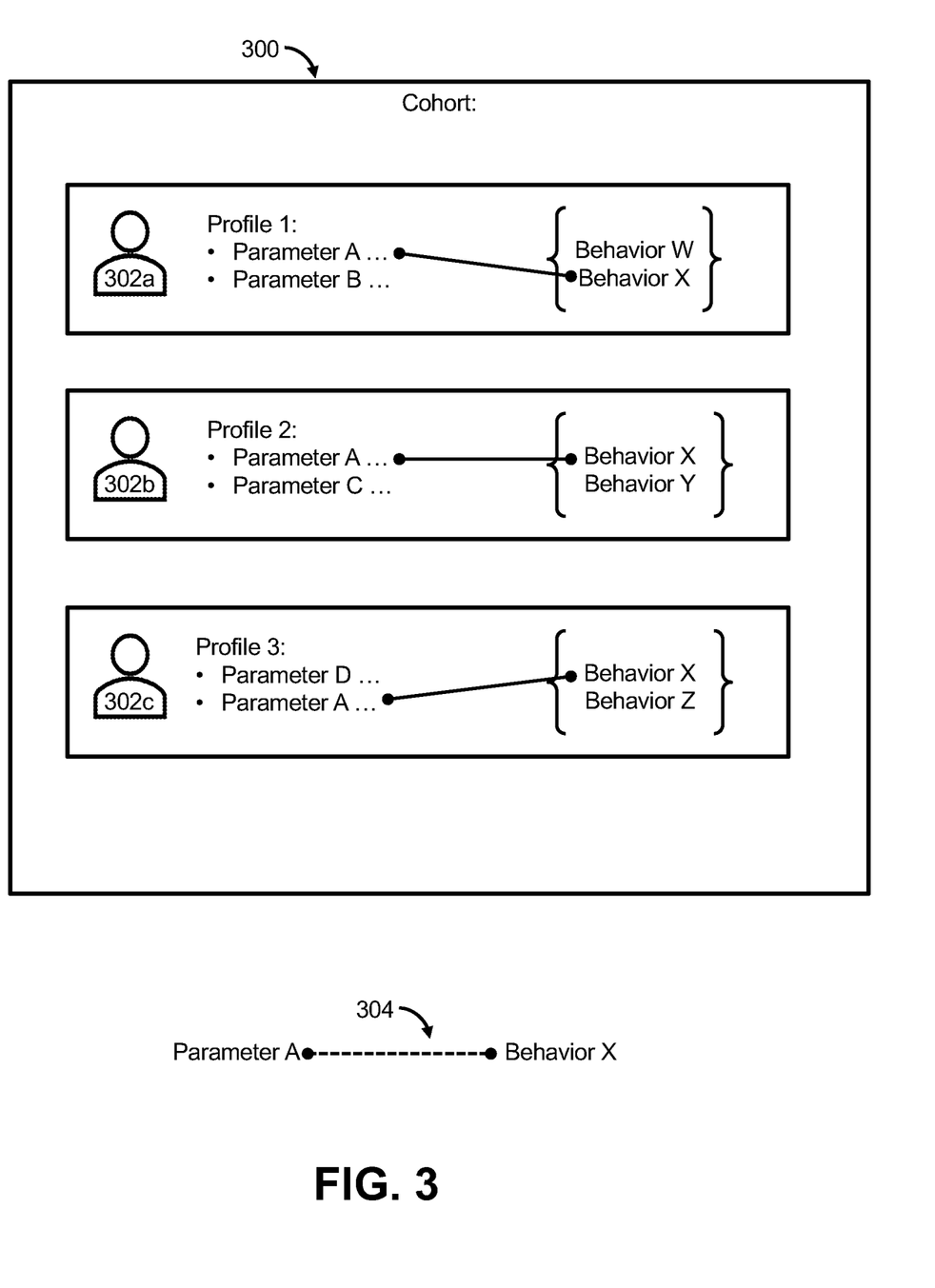
FIG. 3 illustrates an example implementation for correlating user behavior patterns within an online game with psychological attributes of users exhibiting the user behavior patterns, in accordance with one or more implementations.

FIG. 3 illustrates an example implementation for correlating user behavior patterns within an online game with psychological attributes of users exhibiting the user behavior patterns, in accordance with one or more implementations. FIG. 3 illustrates cohort 300. Cohort 300 includes users 302a, 302b, and 302c. Users 302a, 302b, and 302c are associated with psychological profiles (e.g., Profile 1, Profile 2, and Profile 3, respectively) that define psychological parameter values of the users. Users 302a, 302b, and 302c may perform user behavior patterns within an online game. For example, user 302a may perform behaviors W and X, user 302b may perform behaviors X and Y, and user 302c may perform behaviors X and Z. Based on the assignments of users 302a, 302b, and 302c to cohort 300, the user behavior patterns, and commonalities in psychological profiles (e.g., Parameter A), a correlation 304 between Parameter A and behavior X may be determined.

Figure 4:
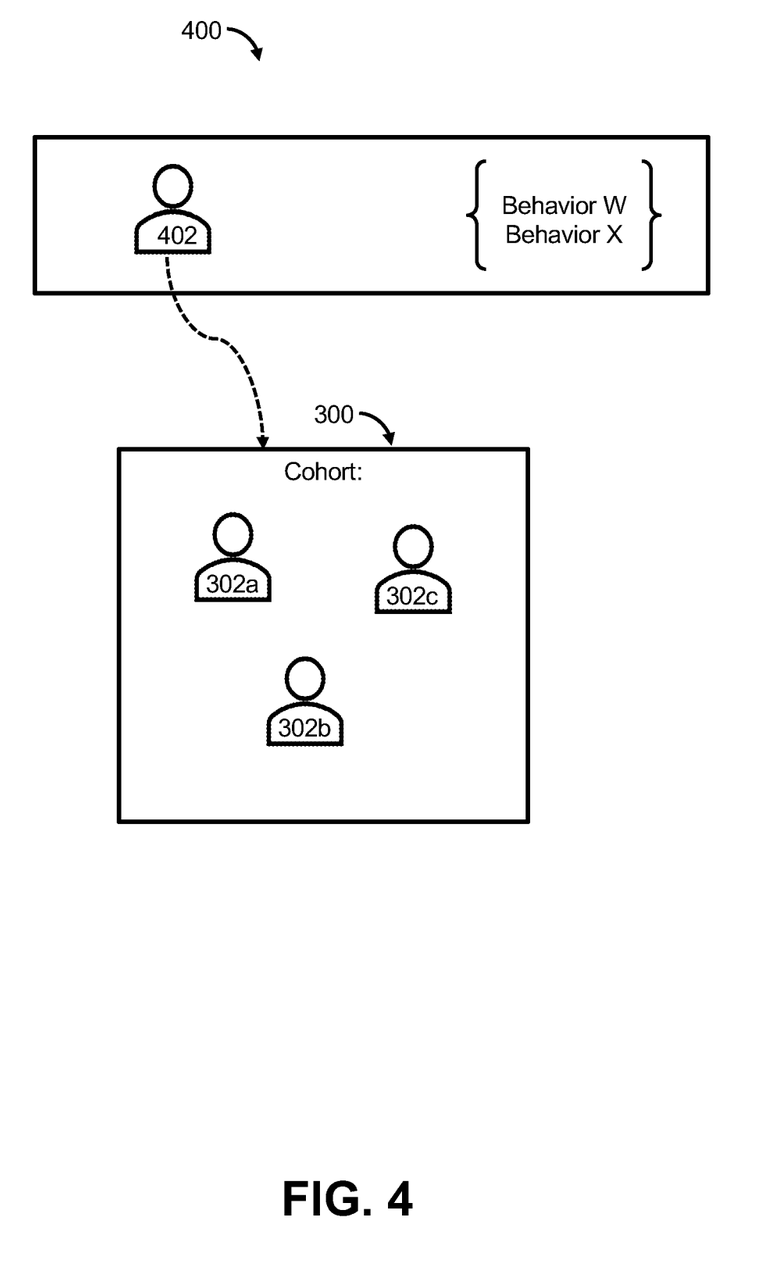
FIG. 4 illustrates an example implementation for correlating user behavior patterns within an online game with psychological attributes of users exhibiting the user behavior patterns, in accordance with one or more implementations.

FIG. 4 illustrates an example implementation for correlating user behavior patterns within an online game with psychological attributes of users exhibiting the user behavior patterns, in accordance with one or more implementations. FIG. 4 illustrates utilization implementation 400. Utilization implementation 400 may include an unstated user 402 whom has performed user behavior patterns (e.g., behavior W and behavior X). Unstated user 402 may not have a psychological profile that is defined by psychological parameter values. Upon obtainment of the user behavior patterns of user 304 and the determined correlations (e.g., correlation 304 between Behavior X and Parameter A of FIG. 3), user 402 may be assigned to cohort 300 (of FIG. 3) alongside users 302a, 302b, and 302c. Correlation 304 may infer that user 402 and users 302a, 302b, and 302c may have a commonality between psychological attributes (e.g., Parameter A), and thus user 402 may be assigned to and/or fit best with cohort 300.

In some implementations, server(s) 102, client computing platform(s) 104, game server(s) 132, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, game server(s) 132, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, information determined by processor(s) 120, information received from game server(s) 132, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as individual single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 110, 112, and/or 114, and/or other components. Processor(s) 130 may be configured to execute components 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, and/or 114 are illustrated in FIG. 1 as being implemented within a single processing unit, in implementations in which processor(s) 130 includes multiple processing units, one or more of components 110, 112, and/or 114 may be implemented remotely from the other components. The description of the functionality provided by the different components 110, 112, and/or 114 described below is for illustrative purposes, and is not intended to be limiting, as any of components 110, 112, and/or 114 may provide more or less functionality than is described. For example, one or more of components 110, 112, and/or 114 may be eliminated, and some or all of its functionality may be provided by other ones of components 110, 112, and/or 114. As another example, processor(s) 130 may be configured to execute one or more additional components that may perform some or all of the functionality attributed below to one of components 110, 112, and/or 114.

Game server(s) 132 may include one or more processors 120, electronic storage, and/or other components. Game server(s) 132 may include communication lines, or ports to enable the exchange of information with a network and/or other computing platforms. Illustration of game server(s) 132 in FIG. 1 is not intended to be limiting. Game server(s) 132 may include a plurality of hardware, software, and/or firmware components operating together to provide the functionality attributed herein to game server(s) 132. For example, game server(s) 132 may be implemented by a cloud of computing platforms operating together as game server(s) 132.

In some implementations, game server(s) 132 may include an electronic storage similar to electronic storage 128 that may store software algorithms, information determined by processor(s) 130, information received from server(s) 102, information received from client computing platform(s) 104, information determined by processor(s) 120, information received from game server(s) 132, and/or other information that enables game server(s) 132 to function as described herein.

Processor(s) 120 may be configured to provide information processing capabilities in game server(s) 132. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as individual single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, and/or other components (e.g., components 110, 112, and/or 114). Processor(s) 120 may be configured to execute components 108, and/or other components by software; hardware; firmware; some combination of software, hardware, and/or firmware; and/or other mechanisms for configuring processing capabilities on processor(s) 120.

It should be appreciated that the description of the functionality provided by component 108 described below is for illustrative purposes, and is not intended to be limiting, as component 108 may provide more or less functionality than is described.

In some implementations, some or all of the functionality of one or more of components 108, 110, 112, and/or 114 will be attributed to server(s) 102, game server(s) 132, can be shared amongst both server(s) 102 and game server(s) 132, can implemented amongst servers or sub servers, and/or variations thereof.

For example, and some or all functionality of component 108 may be provided by other ones of components 110, 112, and/or 114 of server(s) 102 or be executed by server(s) 102 as opposed to game server(s) 132. As another example, processor(s) 120 may be configured to execute one or more additional components that may perform some or all of the functionality attributed below to one of components 108, 110, 112, and/or 114.

Figure 2:
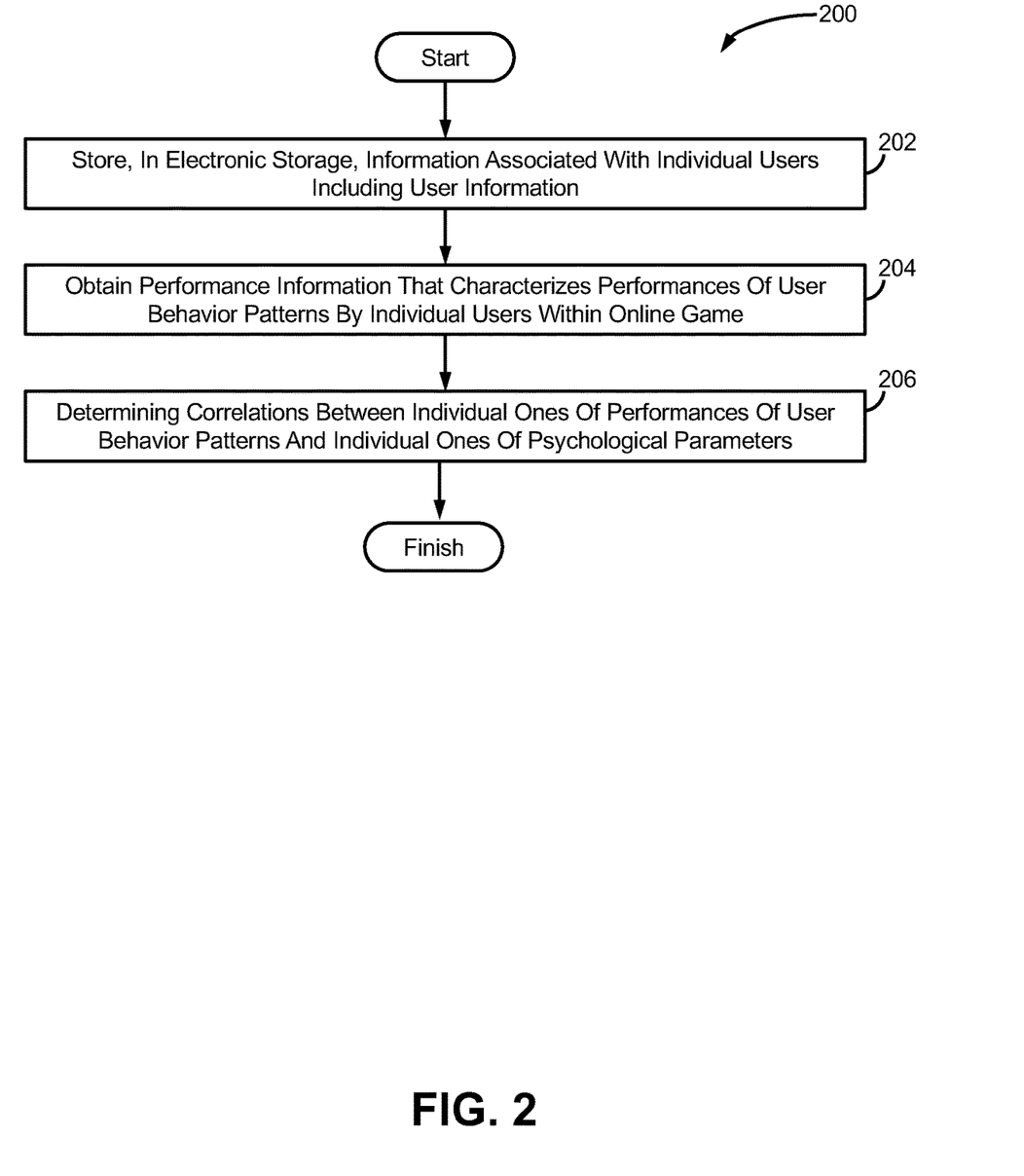
FIG. 2 illustrates a method to correlate user behavior patterns within an online game with psychological attributes of users exhibiting the user behavior patterns, in accordance with one or more implementations.

FIG. 2 illustrates a method 200 to correlate user behavior patterns within an online game with psychological attributes of users exhibiting the user behavior patterns, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing, in electronic storage, information associated with the individual users including the user information. Operation 202 may be performed by one or more hardware processors configured by machine-readable instructions including a component that is the same as or similar to electronic storage 128 and information component 110, in accordance with one or more implementations.

An operation 204 may include obtaining performance information that characterizes performances of user behavior patterns by the individual users within the online game. The client computing platforms may be associated with the users. Operation 204 may be performed by one or more hardware processors configured by machine-readable instructions including a component that is the same as or similar to information component 110, in accordance with one or more implementations.

An operation 206 may include determining correlations between individual ones of the performances of the user behavior patterns and individual ones of the psychological parameters. The determination may be based on the obtained user behavior patterns, the assignments of the users to the cohorts, and commonalities in the psychological profiles of the users within the individual cohorts. Operation 206 may be performed by one or more hardware processors configured by machine-readable instructions including a component that is the same as or similar to correlation component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to correlate user behavior patterns within an online game with psychological attributes of users exhibiting the user behavior patterns, the system comprising:

electronic storage configured to store information associated with the individual users including user information, wherein the user information includes assignments of the individual users to individual ones of different cohorts of users, wherein the different cohorts are associated with different psychological profiles, where a given psychological profile is defined by multiple psychological parameter values, and the users are assigned to the different cohorts based on the psychological parameter values of the individual users determined based on stated information provided by the users, the user information including user information for a first user that includes an assignment of the first user to a first cohort based on a first psychological profile of the first user determined based on stated information previously provided by the first user, wherein the psychological profiles of the users assigned to the first cohort indicate strong presentation of a first psychological parameter; and one or more processors configured by machine-readable instructions to:

obtain performance information that characterizes performances of user behavior patterns by the individual users within the online game, wherein the individual performances of user behavior patterns include a first performance of a first pattern by the first user and other users assigned to the first cohort;

determine correlations between individual ones of the performances of the user behavior patterns and individual ones of the psychological parameters based on the obtained user behavior patterns, the assignments of the users to the cohorts, and commonalities in the psychological profiles of the users within the individual cohorts such that a first correlation is determined between the first performance of the first pattern and the first psychological parameter based on relatively frequent performance of the first performance by the users assigned to the first cohort and the psychological profiles of the users assigned to the first cohort indicating strong presentation of the first psychological parameter; and adapt the online game for the individual users based on the determined correlations such that a first adaptation to the online game is made for the users of the first cohort, including the first user.

2. The system of claim 1, wherein the first adaptation includes one or more of a recommendation, a suggestion, an adjusted difficulty setting, a piece of game content made available, an omission of game content, means of communication, a communication, an offer to sell one or more virtual items made available, an adjustment of an offer to sell one or more virtual items, matching users for particular circumstances, detecting toxic users, and/or adjusted presentation of a user interface.

3. The system of claim 1, wherein the one or more processors are further configured to:

assign individual unstated users to individual cohorts based on their performance of user behavior patterns and the determined correlations, wherein the unstated users did not provide stated information and thus do not have psychological profiles defined by psychological parameter values, the unstated users including a second user such that the second user is assigned to the first cohort based on a second performance of a second pattern by the second user and the first correlation.

4. The system of claim 3, wherein the one or more processors are further configured to:

upon assignment of the individual unstated users to the individual cohorts, obtain the performance information that characterizes performances of user behavior patterns by the individual unstated users such that upon assignment of the second user to the first cohort, the second performance is obtained, wherein the determining of the correlations is based on the obtained performances of user behavior patterns by the individual unstated users including the second performance.

5. The system of claim 1, wherein the user behavior patterns include actions performed by the users, the user behavior patterns including individual actions, sets of actions, ordered sets of actions, and/or multiple of the individual actions, the sets of actions, and the ordered set of actions.

6. The system of claim 5, wherein the actions include one or more of a purchase, a sale, a trade, a selection of a user interface element, time spent on a particular user interface, time of a session of the online game, engagement with virtual content, communication of the users with particular users, completion of tasks by the users, uncompletion tasks by the users, failure of tasks by the users, frequent interaction with content of the users, and/or formation of alliances by the users.

7. The system of claim 1, wherein the first psychological profile is included in the user information for the first user.

8. The system of claim 1, wherein the stated information includes sets of answers to questions that relate to psychological attributes, wherein the stated information previously provided by the first user is included in the user information for the first user.

9. The system of claim 1, wherein the relatively frequent performance of the first performance by the users assigned to the first cohort is performed more frequently than other user behavior patterns.

10. The system of claim 9, wherein the other user behavior patterns include a second pattern performed by the users assigned to the first cohort.

11. The system of claim 9, wherein the other user behavior patterns include a second pattern performed by the users assigned to other ones of the different cohorts.

12. The system of claim 1, wherein the one or more processors are further configured to:

execute an instance of the online game and implementing the instance of the online game by receiving and executing commands, wherein the commands are received from the users through client computing platforms associated with the users, wherein the users include the first user, wherein execution of the commands facilitates interactions between the users and/or content within the online game, wherein implementing the instance of the online game includes determining individual view information for presentation of the online game to the users on the client computing platforms; and present the individual view information of the online game to the users, such that the presented view information includes the adapted online game for the individual users.

13. A method to correlate user behavior patterns within an online game with psychological attributes of users exhibiting the user behavior patterns, the method comprising:

storing, in electronic storage, information associated with the individual users including user information, wherein the user information includes assignments of the individual users to individual ones of different cohorts of users, wherein the different cohorts are associated with different psychological profiles, where a given psychological profile is defined by multiple psychological parameter values, and the users are assigned to the different cohorts based on the psychological parameter values of the individual users determined based on stated information provided by the users, the user information including user information for a first user that includes an assignment of the first user to a first cohort based on a first psychological profile of the first user determined based on stated information previously provided by the first user, wherein the psychological profiles of the users assigned to the first cohort indicate strong presentation of a first psychological parameter;

obtaining performance information that characterizes performances of user behavior patterns by the individual users within the online game, wherein the individual performances of user behavior patterns include a first performance of a first pattern by the first user and other users assigned to the first cohort;

determining correlations between individual ones of the performances of the user behavior patterns and individual ones of the psychological parameters based on the obtained user behavior patterns, the assignments of the users to the cohorts, and commonalities in the psychological profiles of the users within the individual cohorts such that a first correlation is determined between the first performance of the first pattern and the first psychological parameter based on relatively frequent performance of the first performance by the users assigned to the first cohort and the psychological profiles of the users assigned to the first cohort indicating strong presentation of the first psychological parameter; and adapting the online game for the individual users based on the determined correlations such that a first adaptation to the online game is made for the users of the first cohort, including the first user.

14. The method of claim 13, further comprising:

assigning individual unstated users to individual cohorts based on their performance of user behavior patterns and the determined correlations, wherein the unstated users did not provide stated information and thus do not have psychological profiles defined by psychological parameter values, the unstated users including a second user such that the second user is assigned to the first cohort based on a second performance of a second pattern by the second user and the first correlation.

15. The method of claim 14, further comprising:

upon assignment of the individual unstated users to the individual cohorts, obtain the performance information that characterizes performances of user behavior patterns by the individual unstated users such that upon assignment of the second user to the first cohort, the second performance is obtained, wherein the determining of the correlations is based on the obtained performances of user behavior patterns by the individual unstated users including the second performance.

16. The method of claim 13, wherein the user behavior patterns include actions performed by the users, the user behavior patterns including individual actions, sets of actions, ordered sets of actions, and/or multiple of the individual actions, the sets of actions, and the ordered set of actions.

17. The method of claim 13, wherein the relatively frequent performance of the first performance by the users assigned to the first cohort is performed more frequently than other user behavior patterns.

18. The method of claim 17, wherein the other user behavior patterns include a second pattern performed by the users assigned to the first cohort.

* * * * *